United States Patent
Kim

(10) Patent No.: US 11,564,118 B2
(45) Date of Patent: Jan. 24, 2023

(54) METHOD AND APPARATUS FOR RESTRICTING MEASUREMENT BASED ON RESULT OF A REFERENCE MEASUREMENT IN WIRELESS COMMUNICATION SYSTEM

(71) Applicant: LG ELECTRONICS INC., Seoul (KR)

(72) Inventor: Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 17/251,188

(22) PCT Filed: Aug. 19, 2019

(86) PCT No.: PCT/KR2019/010506
§ 371 (c)(1),
(2) Date: Dec. 10, 2020

(87) PCT Pub. No.: WO2020/045874
PCT Pub. Date: Mar. 5, 2020

(65) Prior Publication Data
US 2021/0227414 A1  Jul. 22, 2021

(30) Foreign Application Priority Data
Aug. 30, 2018  (KR) .................. 10-2018-0102370

(51) Int. Cl.
*H04W 24/08* (2009.01)
*H04W 16/14* (2009.01)
*H04W 24/10* (2009.01)

(52) U.S. Cl.
CPC .......... *H04W 24/08* (2013.01); *H04W 16/14* (2013.01); *H04W 24/10* (2013.01)

(58) Field of Classification Search
CPC ...... H04W 24/08; H04W 16/14; H04W 24/10
See application file for complete search history.

(56) References Cited

U.S. PATENT DOCUMENTS 6,360,088 B1 *  3/2002  Shi ................. H04B 7/0814
                                                    455/277.1
6,611,679 B1 *  8/2003  Park ................ H04B 1/109
                                                    330/278
(Continued)

FOREIGN PATENT DOCUMENTS

KR   1020160013506      2/2016
KR   1020160094877      8/2016
(Continued)

OTHER PUBLICATIONS

PCT International Application No. PCT/KR2019/010506, International Search Report dated Nov. 26, 2019, 2 pages.
(Continued)

*Primary Examiner* — Zhiren Qin
(74) *Attorney, Agent, or Firm* — Lee Hong Degerman Kang Waimey

(57) ABSTRACT

A method and apparatus for restricting measurement based on result of a reference measurement in wireless communication system is provided. A wireless device, in a wireless communication system, receives configuration to perform a first measurement and a second measurement from a network, wherein the first measurement and the second measurement belong to different measurement categories. The wireless device performs the first measurement on unlicensed frequency. The wireless device determines whether to perform the second measurement on the unlicensed frequency based on result of the first measurement.

5 Claims, 12 Drawing Sheets

(56) References Cited

U.S. PATENT DOCUMENTS

| | | | | |
|---|---|---|---|---|
| 2010/0304738 A1* | 12/2010 | Lim | ............. | H04W 36/30 |
| | | | | 455/426.1 |
| 2011/0070888 A1* | 3/2011 | Iwamura | ......... | H04W 48/20 |
| | | | | 455/435.3 |
| 2015/0031367 A1* | 1/2015 | Singh | ........... | H04W 28/0268 |
| | | | | 455/437 |
| 2016/0080954 A1* | 3/2016 | Hedayat | ........ | H04W 74/0808 |
| | | | | 370/252 |
| 2018/0206138 A1 | 7/2018 | Hayashi et al. | | |
| 2019/0052377 A1* | 2/2019 | Hwang | ........... | H04L 5/0035 |
| 2019/0063936 A1* | 2/2019 | Seifert | ........... | H04W 4/90 |
| 2019/0261376 A1* | 8/2019 | Li | ............. | H04W 52/367 |
| 2019/0306732 A1* | 10/2019 | Dhanapal | ....... | H04W 24/08 |

FOREIGN PATENT DOCUMENTS

| | | |
|---|---|---|
| KR | 1020170051410 | 5/2017 |
| WO | 2018026182 | 2/2018 |

OTHER PUBLICATIONS

3rd Generation Partnership Project (3GPP), "Technical Specification Group Radio Access Network; NR; Radio Resource Control (RRC) protocol specification (Release 15)," Section 5.5 of 3GPP TS 38.331 V15.2.1, Jun. 2018, 20 pages.

* cited by examiner

METHOD AND APPARATUS FOR RESTRICTING MEASUREMENT BASED ON RESULT OF A REFERENCE MEASUREMENT IN WIRELESS COMMUNICATION SYSTEM

CROSS-REFERENCE TO RELATED APPLICATIONS

This application is the National Stage filing under 35 U.S.C. 371 of International Application No. PCT/KR2019/010506, filed on Aug. 19, 2019, which claims the benefit of earlier filing date and right of priority to Korean Patent Application No. 10-2018-0102370, filed on Aug. 30, 2018, the contents of which are all incorporated by reference herein in their entirety.

BACKGROUND OF THE INVENTION

Field of the Invention

The present invention relates to wireless communications, and more particularly, to a method and apparatus for cell reselection using PLMN offset in unlicensed frequency.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

Carrier aggregation with at least one secondary cell (SCell) operating in the unlicensed spectrum is referred to as licensed-assisted access (LAA). In LAA, the configured set of serving cells for a UE therefore always includes at least one SCell operating in the unlicensed spectrum according to frame structure Type 3, also called LAA SCell. Unless otherwise specified, LAA SCells act as regular SCells. LAA eNodeB (eNB) and user equipment (UE) apply listen-before-talk (LBT) before performing a transmission on LAA SCell. When LBT is applied, the transmitter listens to/senses the channel to determine whether the channel is free or busy. If the channel is determined to be free, the transmitter may perform the transmission. Otherwise, it does not perform the transmission. If an LAA eNB uses channel access signals of other technologies for the purpose of LAA channel access, it shall continue to meet the LAA maximum energy detection threshold requirement.

SUMMARY OF THE INVENTION

NR standalone operation on unlicensed bands is being discussed. Therefore, a method for supporting NR standalone operation on unlicensed bands efficiently is required.

In an aspect, a method performed by a wireless device in a wireless communication system is provided. The method includes receiving configuration to perform a first measurement and a second measurement from a network, wherein the first measurement and the second measurement belong to different measurement categories, performing the first measurement on unlicensed frequency, and determining whether to perform the second measurement on the unlicensed frequency based on result of the first measurement.

In another aspect, a wireless device in a wireless communication system is provided. The wireless device includes a memory, a transceiver, and a processor, operably coupled to the memory and the transceiver, and configured to control the transceiver to receive configuration to perform a first measurement and a second measurement from a network, wherein the first measurement and the second measurement belong to different measurement categories, perform the first measurement on unlicensed frequency, and determine whether to perform the second measurement on the unlicensed frequency based on result of the first measurement.

In another aspect, a processor for a wireless device in a wireless communication system is provided. The processor is configured to control the wireless device to receive configuration to perform a first measurement and a second measurement from a network, wherein the first measurement and the second measurement belong to different measurement categories, perform the first measurement on unlicensed frequency, and determine whether to perform the second measurement on the unlicensed frequency based on result of the first measurement.

According to some embodiments of the present discloser, measurements on unlicensed frequency can be performed efficiently.

DESCRIPTION OF EXEMPLARY
EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
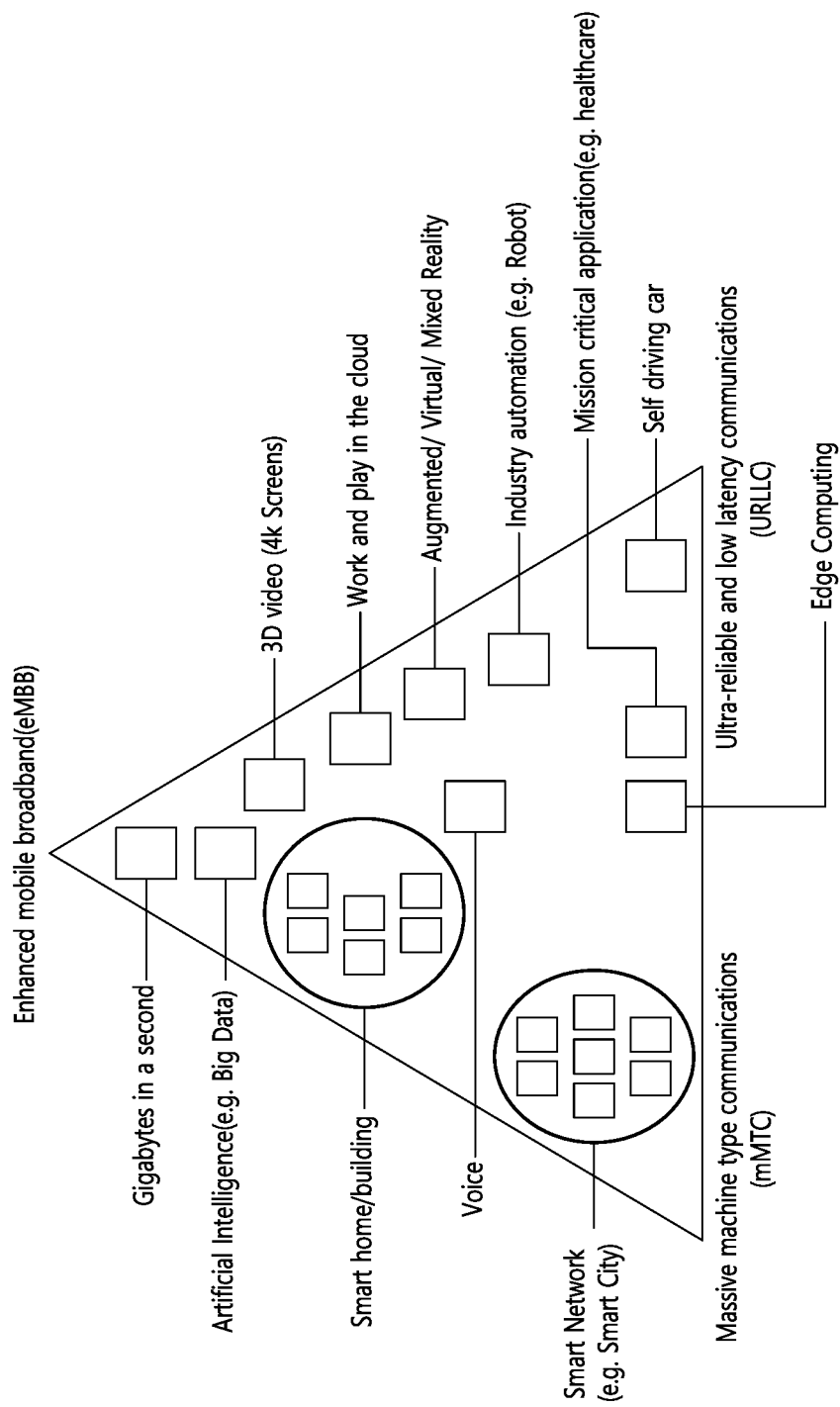
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture, and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
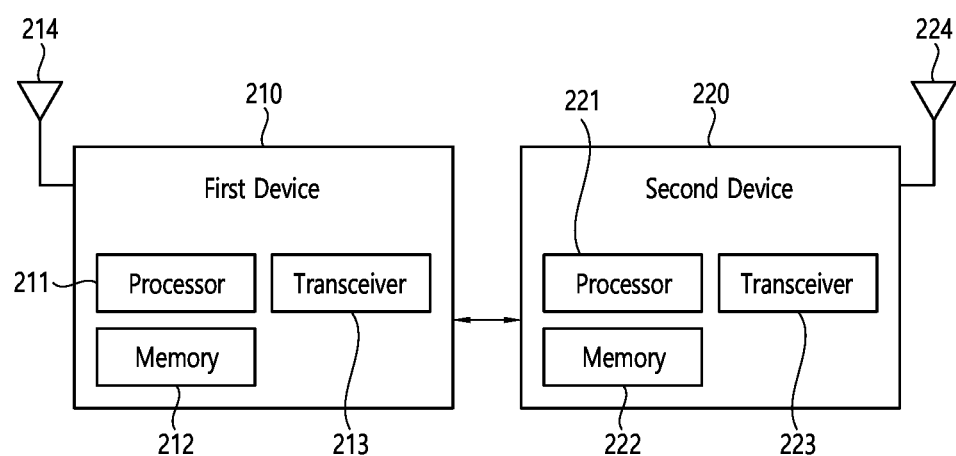
FIG. 2 shows an example of a wireless communication system to which the technical features of the present invention can be applied.

FIG. 2 shows an example of a wireless communication system to which the technical features of the present invention can be applied. Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
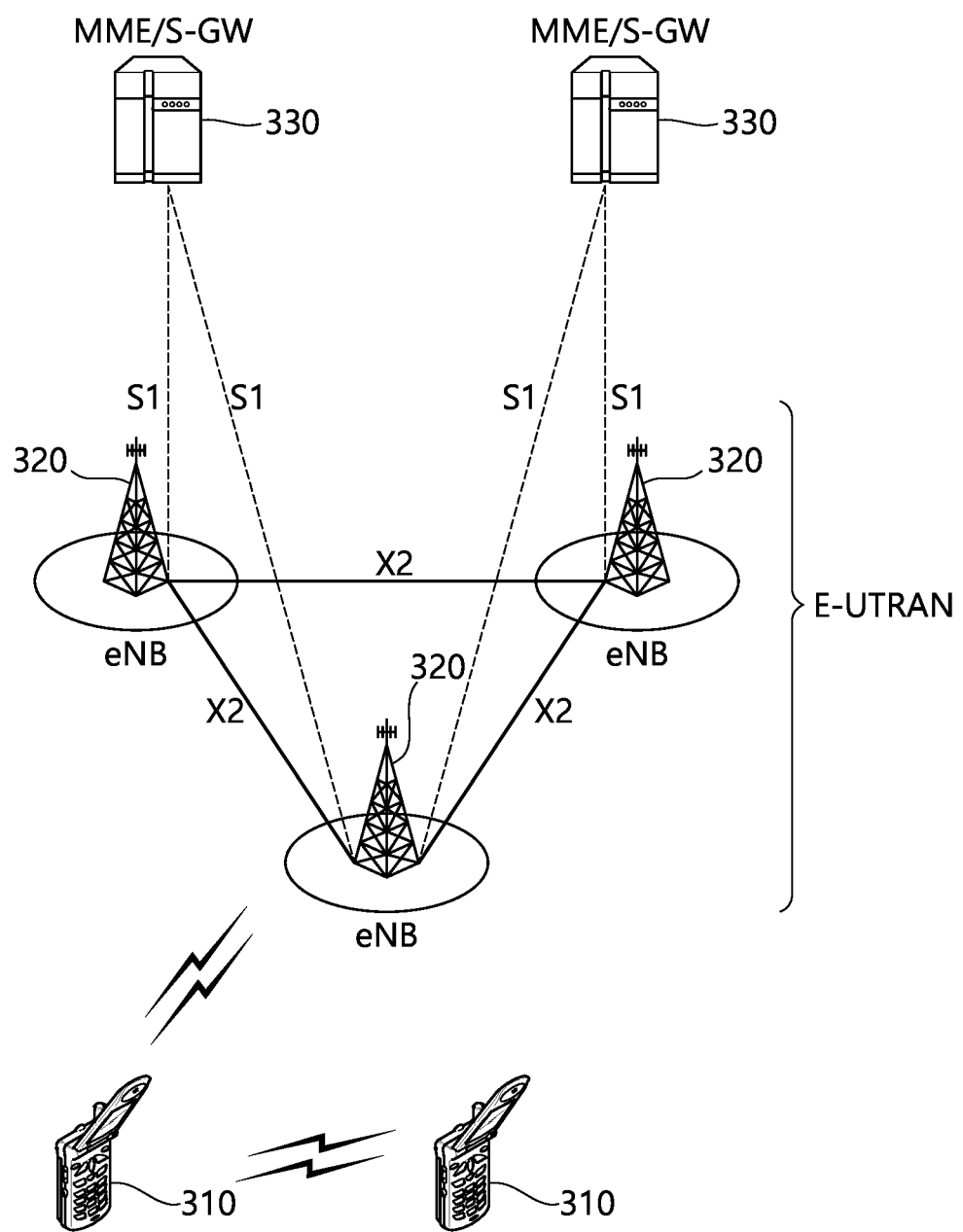
FIG. 3 shows another example of a wireless communication system to which the technical features of the present invention can be applied.

FIG. 3 shows another example of a wireless communication system to which the technical features of the present invention can be applied. Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), and a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
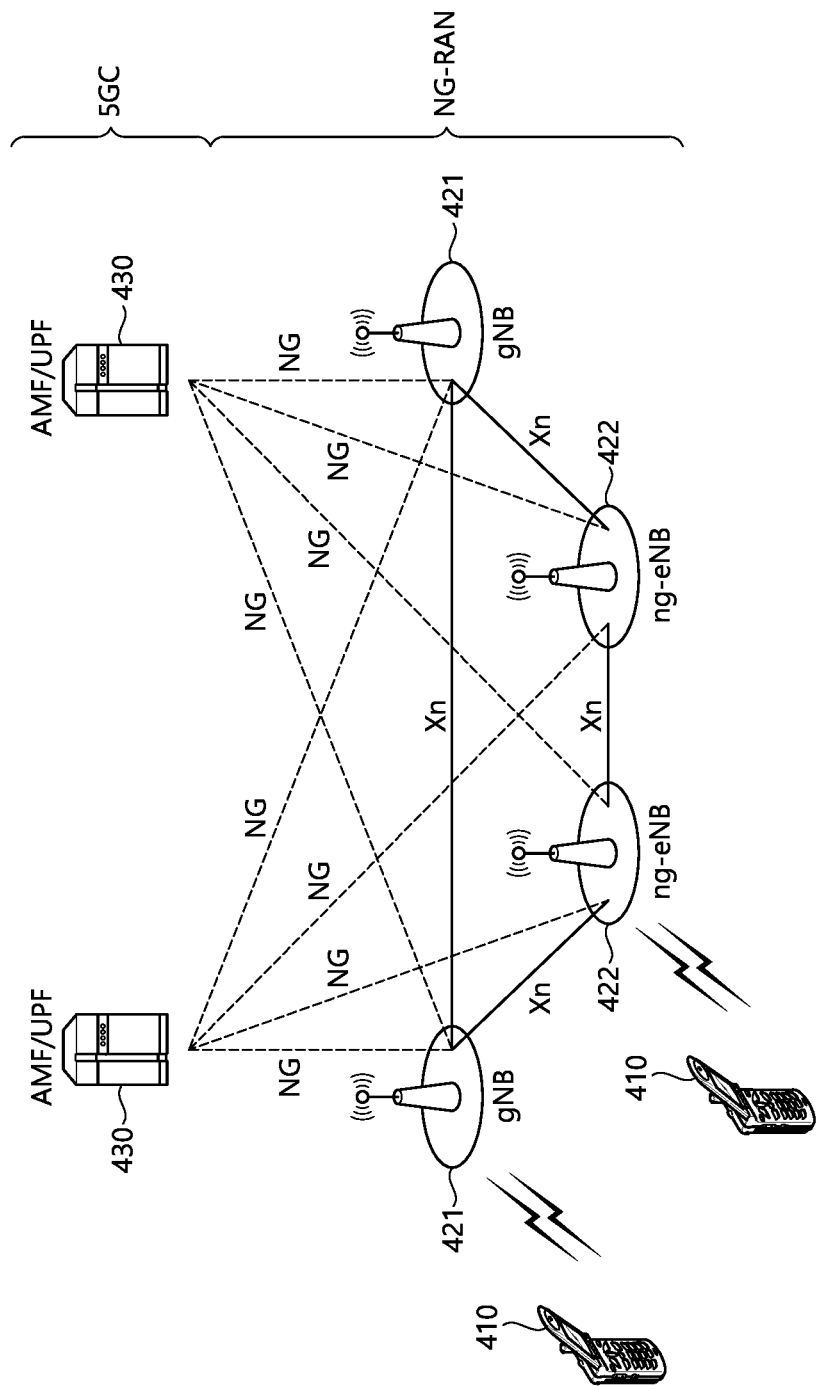
FIG. 4 shows another example of a wireless communication system to which the technical features of the present invention can be applied.

FIG. 4 shows another example of a wireless communication system to which the technical features of the present invention can be applied. Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
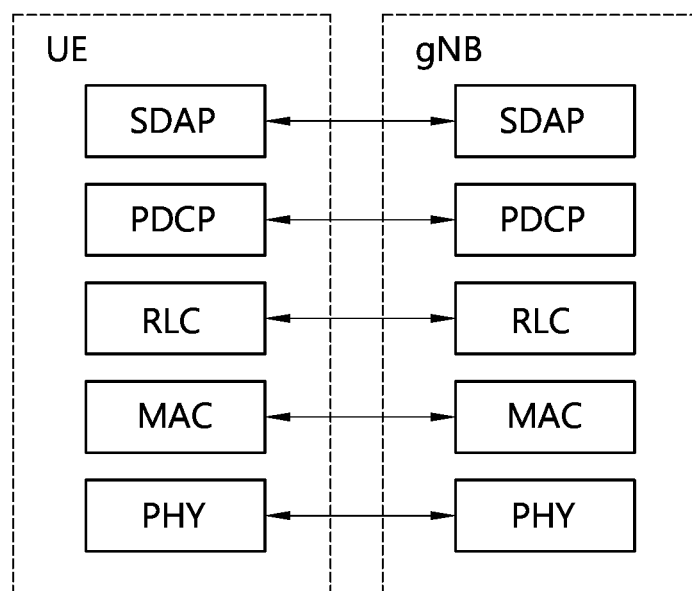
FIG. 5 shows a block diagram of a user plane protocol stack to which the technical features of the present invention can be applied.
Figure 6:
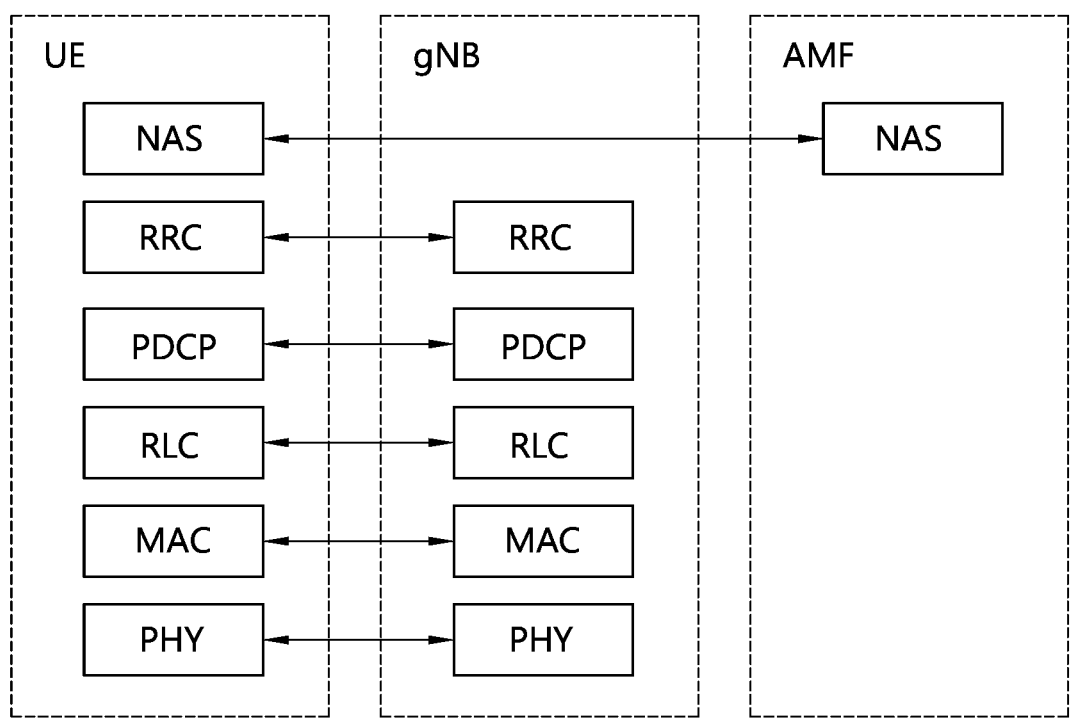
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied. The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC_idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, performing measurements, by a wireless device, will be described. It may be referred to as Section 5.5 of 3GPP TS 38.331 V15.2.1 (2018-06).

The network may configure an RRC_CONNECTED UE to perform measurements and report them in accordance with the measurement configuration. The measurement configuration is provided by means of dedicated signalling i.e. using the RRCReconfiguration.

A UE in RRC_CONNECTED maintains a measurement object list, a reporting configuration list, and a measurement identities list according to signalling and procedures in this specification. The measurement object list possibly includes NR intra-frequency object(s), NR inter-frequency object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

For NR measurement object(s), the UE measures and reports on the serving cell(s), listed cells and/or detected cells.

An RRC_CONNECTED UE shall derive cell measurement results by measuring one or multiple beams associated per cell as configured by the network. For all cell measurement results in RRC_CONNECTED the UE applies the layer 3 filtering, before using the measured results for evaluation of reporting criteria and measurement reporting. For cell measurements, the network can configure RSRP, RSRQ or SINR as trigger quantity. Reporting quantities can be the same as trigger quantity or combinations of quantities (i.e. RSRP and RSRQ; RSRP and SINR; RSRQ and SINR; RSRP, RSRQ and SINR).

The network may also configure the UE to report measurement information per beam (which can either be measurement results per beam with respective beam identifier(s) or only beam identifier(s)). If beam measurement information is configured to be included in measurement reports, the UE applies the layer 3 beam filtering. On the other hand, the exact layer 1 filtering of beam measurements used to derive cell measurement results is implementation dependent.

The network may configure the UE to derive RSRP, RSRQ and SINR measurement results per cell associated to NR measurement objects based on parameters configured in the measObject (e.g. maximum number of beams to be averaged and beam consolidation thresholds) and in the reportConfig (rsType to be measured, SS/PBCH block or CSI-RS).

A UE in RRC_INACTIVE or RRC_IDLE may measure a quality of a serving cell and a neighboring cell for cell reselection. Cell reselection is performed based on cell reselection criteria. Cell reselection criteria have the following characteristics with respect to measurement of the serving cell and the neighboring cell.

Intra-frequency cell reselection is basically performed based on a ranking. The ranking is a work that defines an index value for cell reselection evaluation and that sequences cells in magnitude order of the index value using the index value. A cell having a best index is often referred to as a highest ranked cell. A cell index value is a value that applies a frequency offset or a cell offset, as needed based on a value in which a UE measures for the corresponding cell.

As described above, a wireless device (for example, UE) may perform RRM measurements for mobility purpose in IDLE, INACTIVE or CONNECTED state. Specifically, a wireless device on licensed channel may be configured to perform radio quality measurement (i.e. reference signal received power (RSRP), reference signal received quality (RSRQ), or signal to interference plus noise ratio (SINR, also known as signal to noise plus interference ratio (SNIR)) measurement).

However, a wireless device or unlicensed frequency may be configured to perform not only radio quality measurement, but also channel busy rate (i.e. received signal strength indicator (RSSI) measurement or channel occupancy measurement). Therefore, a wireless device on unlicensed frequency would spend much energy for RRM measurements compared to a wireless device on licensed frequency for additional measurements, i.e. RSSI or channel occupancy measurement.

However, considering that the purpose of the RRM measurement is to find better cell for mobility, UE may not need to perform some measurement if the target is not suitable for mobility.

Hereinafter, methods for restricting measurement based on result of a reference measurement in wireless communication system will be described.

Figure 7:
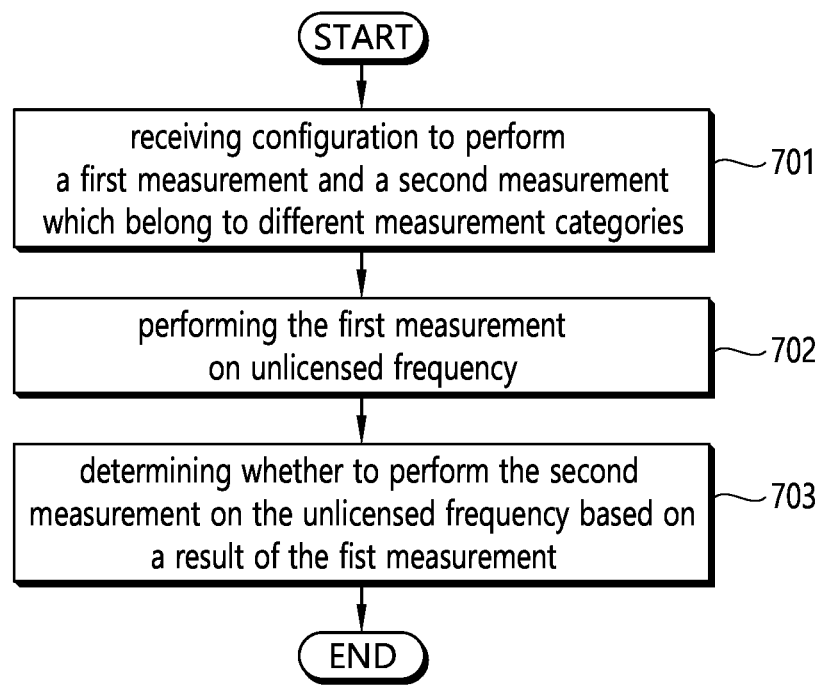
FIG. 7 shows a method for restricting measurement based on result of a reference measurement, according to some embodiments of the present disclosure.

FIG. 7 shows a method for restricting measurement based on result of a reference measurement, according to some embodiments of the present disclosure.

In step 701, a wireless device may receive configuration to perform a first measurement and a second measurement from a network. The configuration to perform the first and the second measurement may include measurement object, respectively. The measurement object may include information of cells on unlicensed frequency.

The first measurement and the second measurement may belong to different measurement categories. Measurement categories may include a channel busy rate measurement category and a channel quality measurement category. The channel busy rate measurement category may include measurement for channel busy rate, such as RSSI measurement and channel occupancy measurement. The channel quality measurement category may include measurement for channel quality, such as RSRP measurement, RSRQ measurement, and SINR measurement.

According to some embodiments of the present disclosure, a wireless device has been configured to perform several types of measurements for a measurement object. One of the several types of measurements may be configured as a reference measurement. For example, the first measurement may be configured as the reference measurement.

According to some embodiments of the present disclosure, one of measurement categories may be configured as a reference measurement category by a network. That is the reference measurement category may be determined by the network among the channel busy rate measurement category and the channel quality measurement category.

For example, a wireless device has been configured to perform several types of measurements included in plurality of measurement categories for a measurement object. One of the plurality of measurement categories may be configured as a reference measurement category. The channel busy rate measurement category or the channel quality measurement category may be configured as the reference measurement category.

In step 702, a wireless device may perform the first measurement, as a reference measurement, on unlicensed frequency. For example, the wireless device may perform the first measurement, as a reference measurement, among configured measurements for the measurement object.

According to some embodiments of the present disclosure, the first measurement may belong to the channel busy rate measurement category. The first measurement may be RSSI measurement or channel occupancy measurement. In this case, the second measurement may belong to the channel quality measurement category. The second measurement may be RSRP measurement, RSRQ measurement, or signal to SINR measurement.

For other example, the first measurement may belong to the channel quality measurement category. The first measurement may be RSRP measurement, RSRQ measurement, or signal to SINR measurement. In this case, the second measurement may belong to the channel busy rate measurement category. The second measurement may be RSSI measurement or channel occupancy measurement.

In other words, one of the channel quality measurement category and the channel busy rate measurement category may be performed first by a wireless device. The first measurement may be referred to one of measurements included in the measurement category performed first. The second measurement may be referred to one of measurements included in other measurement category which is not performed first.

A wireless device may perform RSSI measurement as the first measurement on a specific band (for example, narrow band, wideband, bandwidth part, or whole band) in unlicensed frequency. In other words, the result of the RSSI measurement may include the total power which the wireless device observes across the whole band. The result of RSSI measurement may include main signal, and co-channel non-serving cell signal, adjacent channel interference and even the thermal noise, etc., within the specified band. The result may include the power of non-demodulated signal, so that the wireless device could measure power without any synchronization and demodulation.

A wireless device may perform channel occupancy measurement as the first measurement on band in the unlicensed frequency. The result of channel occupancy measurement may be a ratio of occupied windows over total windows. Specifically, a wireless device may perform RSSI measurements on plurality of windows, respectively, in a specific band. When the result of the RSSI measurement on a specific window is higher than a RSSI threshold value, then the specific window may be determined as occupied window. After performing RSSI measurements on plurality of windows respectively, the wireless device may acquire the ratio of occupied windows over the total windows. The RSSI threshold value may be configured by the network. For example, the RSSI threshold value may be included in the measurement configuration.

A wireless device may perform RSRP measurement as the first measurement on cells in the unlicensed frequency. The result of RSRP measurement may be the linear average over the power contributions (in [W]) of the resource elements that carry cell-specific reference signals within the considered measurement frequency bandwidth. That is, the wireless device may perform RSRP measurement on cells in unlicensed frequency. For example, the wireless device may perfume RSRP measurement on cells included in the measurement object, which is acquired from the measurement configuration.

A wireless device may perform RSRQ measurement as the first measurement on cells in the unlicensed frequency. The result of RSRQ measurement may be (N×RSRP)/RSSI, where N is the number of RBs over the measurement bandwidth. As describe above, RSSI may contain all sorts of power including power from co-channel serving & non-serving cells, adjacent channel interference, thermal noise, etc. Therefore, RSRQ, which is (N×RSRP)/RSSI, may indicate "What is the portion of pure reference signal (RS) power over the whole power received by the wireless device". The wireless device may perform RSRQ measurement on cells in unlicensed frequency. For example, the wireless device may perfume RSRQ measurement on cells included in the measurement object, which is acquired from the measurement configuration.

A wireless device may perform SINR measurement as the first measurement on cells in the unlicensed frequency. The result of SINR measurement may be Signal to Interference plus Noise Ratio. The result of the SINR measurement may include the ratio of the signal (desired signal) and the unwanted noise. The unwanted noise may include of all the external interference and internally generated noise. The wireless device may perform SINR measurement on cells in unlicensed frequency. For example, the wireless device may perfume SINR measurement on cells included in the measurement object, which is acquired from the measurement configuration.

In step 703, a wireless device may determine whether to perform the second measurement on the unlicensed frequency based on result of the first measurement. For example, the wireless device may determine whether to perform other measurements among the configured measurements included in the measurement object, based on the result of the reference measurement.

The wireless device may compare the result of the first measurement with a threshold value to determine whether to perform the second measurement on the unlicensed frequency.

The wireless device may receive the threshold value from the network. The threshold value may be related to the first measurement. For example, if the first measurement is RSSI measurement, the wireless device may receive a RSSI threshold value from the network. If the first measurement is channel occupancy measurement, the wireless device may receive a channel occupancy threshold value from the network. If the first measurement is RSRP measurement, the wireless device may receive a RSRP threshold value from the network. If the first measurement is RSRQ measurement, the wireless device may receive a RSRQ threshold value from the network. If the first measurement is SINR measurement, the wireless device may receive a SINR threshold value from the network.

According to some embodiments of the present disclosure, a wireless device may determine not to perform the second measurement, when the result of the first measurement is higher than the threshold value.

For example, if the first measurement is RSSI measurement or measurement channel and the result of the first measurement is higher than the RSSI threshold value or channel occupancy threshold value, the wireless device may determine not to perform the second measurement. For other example, when result of the first measurement (RSSI measurement or channel occupancy measurement) on a specific band in unlicensed frequency is higher than the related threshold value, the wireless device may determine not to perform the second measurement on the specific band in unlicensed frequency.

According to some embodiments of the present disclosure, a wireless device may determine not to perform the second measurement, when the result of the first measurement is lower than the threshold value.

For example, if the first measurement is RSRQ measurement, RSRP measurement, or SINR measurement and the result of the first measurement is lower than RSRP threshold value, RSRQ threshold value, or SINR threshold value, the wireless device may determine not to perform the second measurement. For other example, when result of the first measurement (RSRP, RSRQ, or SINR measurement) for all cells included in the measurement object for a specific band in unlicensed frequency is lower than a related threshold value, the wireless device may determine not to perform the second measurement on the specific band.

According to some embodiments of the present disclosure, a wireless device may skip to perform the second measurement on the unlicensed frequency, when it is determined not to perform the second measurement. The wireless device may not report of the second measurement.

In other words, the first measurement may be determined by the network. The first measurement which is performed before the second measurement may referred as a reference measurement. The reference measurement could be configured by network. For example, a reference measurement may be configured as RSSI measurement or channel occupancy measurement included in the channel busy rate measurement category. For another example, a reference measurement may be configured as RSRP measurement, RSRQ measurement, or SINR measurement included in the channel quality measurement category.

According to some embodiments of the present disclosure, a wireless device may be an autonomous driving apparatus in communication with at least one of a mobile terminal, a network, and/or autonomous vehicles other than the wireless device.

Figure 8:
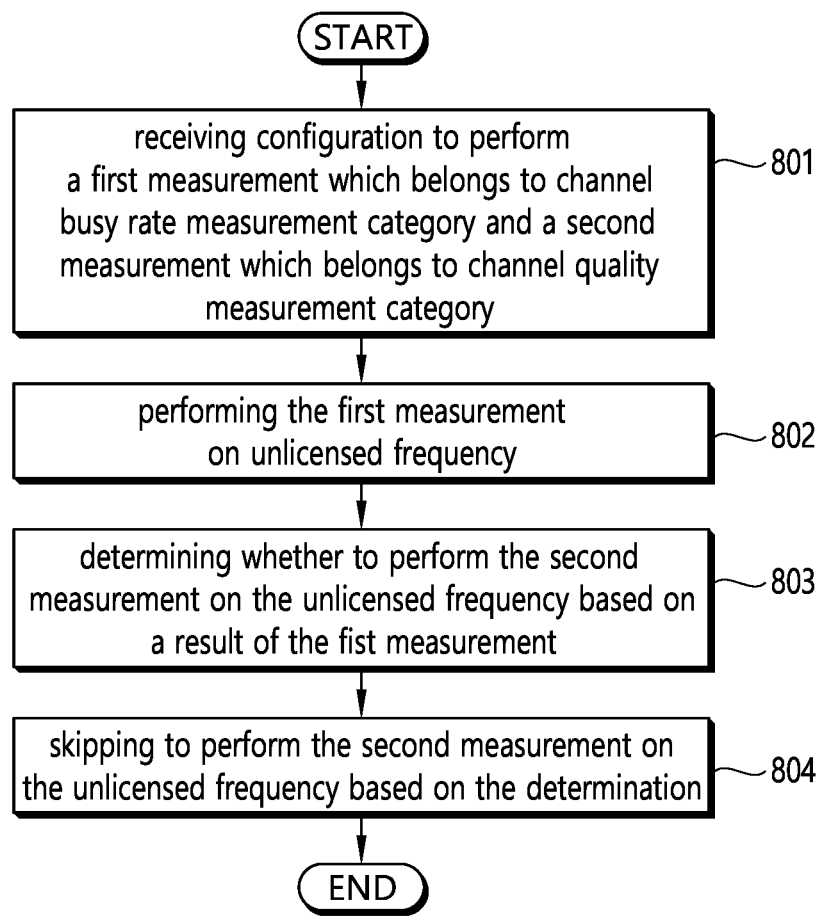
FIG. 8 shows an example of a method for restricting measurement based on result of a reference measurement in wireless communication system, according to some embodiments of the present disclosure.

FIG. 8 shows an example of a method for restricting measurement based on result of a reference measurement in wireless communication system, according to some embodiments of the present disclosure.

In step 801, a wireless device may receive configuration to perform a first measurement which belongs to channel busy rate measurement category and a second measurement which belongs to channel quality measurement category. That is, the channel busy rate measurement category may be configured as a reference measurement category. In this case, a first measurement may be RSSI measurement or channel occupancy measurement, as a reference measurement.

In step 802, a wireless device may perform the first measurement on unlicensed frequency. The wireless device may perform the RSSI measurement or the channel occupancy measurement, as a reference measurement, on band in unlicensed frequency.

In step 803, a wireless device may determine whether to perform the second measurement (or other measurement, except the first measurement, belong to the channel quality measurement category) on the unlicensed frequency based on a result of the first measurement. The wireless device may receive a threshold value related to the first measurement from the network. The wireless device may compare the result of the first measurement with the threshold value. When the result of the first measurement is higher than the threshold value, than the wireless device may determine that the band is not suitable, even before performing the second measurement for channel quality. The wireless device may determine not to perform the second measurement (or other measurements belong to channel quality measurement category).

In step 804, a wireless device may skip to perform the second measurement on the unlicensed frequency based on the determination. The wireless device may skip to perform the second measurement (or other measurements belong to channel quality measurement category), when the result of the first measurement is higher than the related threshold value.

Figure 9:
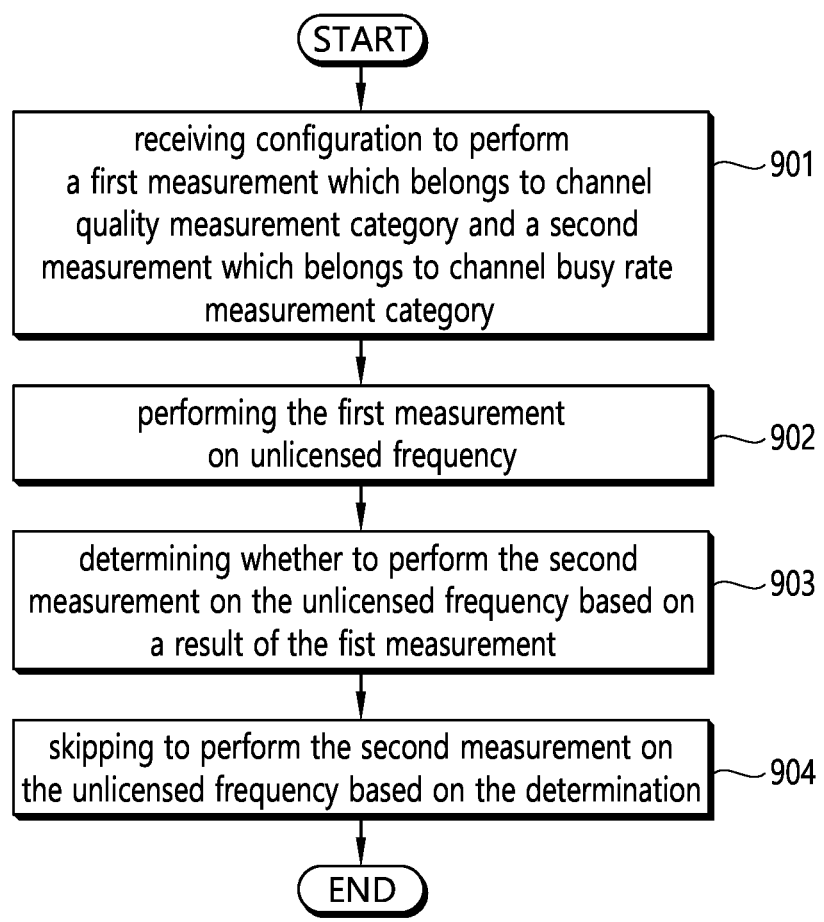
FIG. 9 shows an example of a method for restricting measurement based on result of a reference measurement in wireless communication system, according to some embodiments of the present disclosure.

FIG. 9 shows an example of a method for restricting measurement based on result of a reference measurement in wireless communication system, according to some embodiments of the present disclosure.

In step 901, a wireless device may receive configuration to perform a first measurement which belongs to channel quality measurement category and a second measurement which belongs to channel busy rate measurement category. That is, the channel quality measurement category may be configured as a reference measurement category. In this case, a first measurement may be RSRQ measurement, RSRP measurement, or SINR measurement, as a reference measurement.

In step 902, a wireless device may perform the first measurement on unlicensed frequency. The wireless device may perform the RSRQ measurement, the RSRP measurement, or the SINR measurement, as a reference measurement, on cells included in the measurement objects or cells included in unlicensed frequency.

In step 903, a wireless device may determine whether to perform the second measurement (or other measurement, except the first measurement, belong to the channel busy rate measurement category) on the unlicensed frequency based on a result of the first measurement. The wireless device may receive a threshold value related to the first measurement from the network. The wireless device may compare the result of the first measurement with the threshold value. When the result of the first measurement on every cells by the wireless device is lower than the threshold value, than the wireless device may determine that the cells in the unlicensed frequency is not suitable, even before performing the second measurement for channel busy rate. The wireless device may determine not to perform the second measurement (or other measurements belong to channel busy rate measurement category).

In step 904, a wireless device may skip to perform the second measurement on the unlicensed frequency based on the determination. The wireless device may skip to perform the second measurement (or other measurements belong to channel busy rate measurement category), when the result of the first measurement on every cells is lower than the related threshold value.

According to some embodiments of the present disclosure, when a wireless device has been configured to perform several types of measurements for a measurement object, the wireless device may perform a reference measurement among configured measurements for the measurement object, and the wireless device may decide whether to perform other measurements for the measurement object based on the results of the reference measurement.

For example, a wireless device may performs other configured measurements for a measurement object if the reference measurement result of the measurement object is as follow:

If the reference measurement is RSSI, and if the RSSI result is lower than a RSSI threshold.

If the reference measurement is channel occupancy measurement, and if the channel occupancy result is lower than a channel occupancy threshold.

If the reference measurement is RSRP, and if the RSRP result is higher than a RSRP threshold at least for a cell included in the measurement object.

If the reference measurement is RSRQ, and if the RSRQ result is higher than a RSRQ threshold at least for a cell included in the measurement object.

If the reference measurement is SINR, and if the SINR result is higher than a SINR threshold at least for a cell included in the measurement object.

If not, the UE doesn't perform other configured measurements.

For example, a wireless device may not perform other configured measurements for a measurement object if the reference measurement result of the measurement object is as follow:

If the reference measurement is RSSI, and if the RSSI result is higher than a RSSI threshold.

If the reference measurement is channel occupancy measurement, and if the channel occupancy result is higher than a channel occupancy threshold.

If the reference measurement is RSRP, and if the RSRP result is lower than a RSRP threshold for all cells included in the measurement object.

If the reference measurement is RSRQ, and if the RSRQ result is lower than a RSRQ threshold for all cells included in the measurement object.

If the reference measurement is SINR, and if the SINR result is lower than a SINR threshold for all cells included in the measurement object.

If not, the UE performs other configured measurements.

According to some embodiments of the present disclosure, a wireless device could be configured to perform following types of measurement: RSRP, RSRQ, SINR, RSSI and/or channel occupancy. Desirably, UE performs a measurement irrespective of the result of the reference measurement if the measurement and the reference measurement belong to the same measurement category. For example, RSRP, RSRQ and SINR measurement belong to the same measurement category. RSSI and channel occupancy measurement belong to the same measurement category.

According to some embodiments of the present disclosure, a wireless device is configured to perform RSSI measurement, channel occupancy measurement, RSRP and RSRQ measurement for frequency A and B. The reference measurement is set to RSSI measurement, and the RSSI threshold is configured to the wireless device.

The wireless device may perform the RSSI measurement and channel occupancy measurement for frequency A and B. The RSSI measurement result of frequency A is lower than the RSSI threshold meanwhile the RSSI measurement result of frequency B is higher than the RSSI threshold.

The wireless device may perform other measurements, i.e. RSRP and RSRQ measurement, only for frequency A, i.e. the wireless device may not perform other measurements for frequency B.

According to some embodiments of the present disclosure, a reference measurement category can be configured by network. When a reference measurement category is configured for a wireless device, the wireless device may perform all configured measurements which belong to the reference measurement category. Based on the measurement results of the measurements that belong to the reference category, the wireless device may decide whether to perform measurements that belong to another category.

If condition related to the threshold value is met for all measurements that belong to the reference measurement category, the wireless device may perform other configured measurements for a measurement object.

If not, the wireless device may not perform other configured measurements for a measurement object.

For example, the reference measurement category may be set to the channel busy rate measurement, i.e. RSSI measurement and channel occupancy measurement. Then the UE performs the RSSI measurement and channel occupancy measurement.

If the RSSI result is higher than a RSSI threshold and if the channel occupancy result is higher than a channel occupancy threshold, the wireless device may perform RSRP and RSRQ measurement for the measurement object. If not, the wireless device may not perform RSRP and RSRQ measurement.

According to some embodiments of the present disclosure, a wireless device may save power and resource for measurement on unlicensed frequency. When the result of the reference measurement, included in a certain measurement object, is not good, the wireless device may determine that the cells belong to the measurement object are not suitable for mobility. Therefore, the wireless device may not need to perform other measurements included in the specific measurement object. That is, a wireless device may not perform unnecessary measurement even though the wireless device is configured to perform the measurement. Thus the wireless device may reduce the power consumption for measurements on unlicensed frequency.

Figure 10:
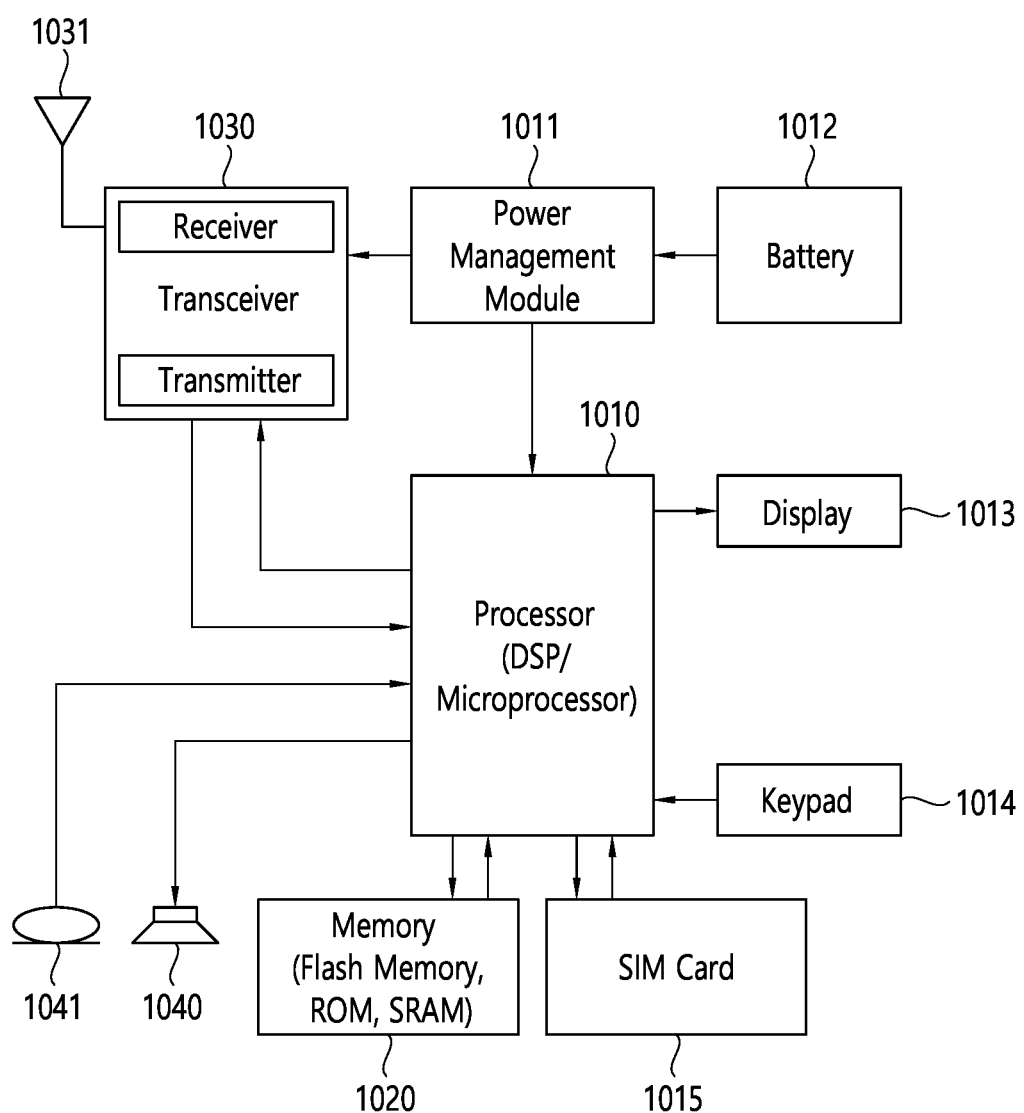
FIG. 10 shows an apparatus for restricting measurement based on result of a reference measurement in wireless communication system, according to some embodiments of the present disclosure.

FIG. 10 shows an apparatus for restricting measurement based on result of a reference measurement in wireless communication system, according to some embodiments of the present disclosure. The description of the same parts as those described above will be simplified or omitted.

A wireless device includes a processor 1010, a power management module 1011, a battery 1012, a display 1013, a keypad 1014, a subscriber identification module (SIM) card 1015, a memory 1020, a transceiver 1030, one or more antennas 1031, a speaker 1040, and a microphone 1041.

The processor 1010 may be configured to implement proposed functions, procedures and/or methods described in this description. Layers of the radio interface protocol may be implemented in the processor 1010. The processor 1010 may include application-specific integrated circuit (ASIC), other chipset, logic circuit and/or data processing device. The processor 1010 may be an application processor (AP). The processor 1010 may include at least one of a digital signal processor (DSP), a central processing unit (CPU), a graphics processing unit (GPU), a modem (modulator and demodulator). An example of the processor 1010 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 1011 manages power for the processor 1010 and/or the transceiver 1030. The battery 1012 supplies power to the power management module 1011. The display 1013 outputs results processed by the processor 1010. The keypad 1014 receives inputs to be used by the processor 1010. The keypad 1014 may be shown on the display 1013. The SIM card 1015 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1020 is operatively coupled with the processor 1010 and stores a variety of information to operate the processor 1010. The memory 1020 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1020 and executed by the processor 1010. The memory 1020 can be implemented within the processor 1010 or external to the processor 1010 in which case those can be communicatively coupled to the processor 1010 via various means as is known in the art.

The transceiver 1030 is operatively coupled with the processor 1010, and transmits and/or receives a radio signal. The transceiver 1030 includes a transmitter and a receiver. The transceiver 1030 may include baseband circuitry to process radio frequency signals. The transceiver 1030 controls the one or more antennas 1031 to transmit and/or receive a radio signal.

The speaker 1040 outputs sound-related results processed by the processor 1010. The microphone 1041 receives sound-related inputs to be used by the processor 1010.

According to some embodiments of the present disclosure, the processor 1010 may be configured to be coupled operably with the memory 1020 and the transceiver 1030. The processor 1010 may be configured to control the transceiver 1030 to receive configuration to perform a first measurement and a second measurement from a network, wherein the first measurement and the second measurement belong to different measurement categories. The processor 1010 may be configured to perform the first measurement on unlicensed frequency. The processor 1010 may be configured to determine whether to perform the second measurement on the unlicensed frequency based on result of the first measurement.

According to some embodiments of the present disclosure shown in FIG. 10, a processor 1010 of a wireless device may save power and resource for measurement on unlicensed frequency. As described above, the processor 1010 of the wireless device may not perform unnecessary measurement even though the wireless device is configured to perform the measurement. Therefore the processor 1010 of the wireless device may reduce the power consumption for measurements on unlicensed frequency.

The present invention may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

<Robot>

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

<Autonomous-Driving/Self-Driving>

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

<XR>

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner XR technology can be applied to HMD, head-up display (HUD), mobile phone, tablet PC, laptop, desktop, TV, digital signage. A device to which the XR technology is applied may be referred to as an XR device.

Figure 11:
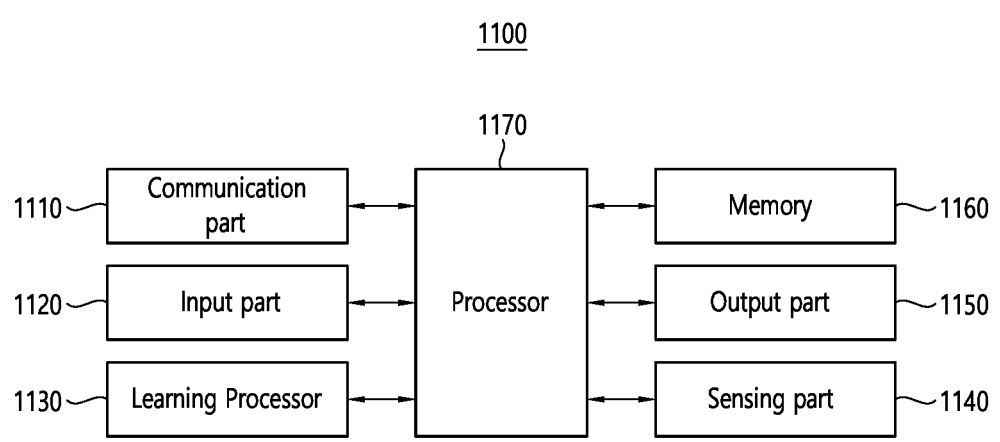
FIG. 11 shows an example of an AI device to which the technical features of the present invention can be applied.

FIG. 11 shows an example of an AI device to which the technical features of the present invention can be applied.

The AI device 1100 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 11, the AI device 1100 may include a communication part 1110, an input part 1120, a learning processor 1130, a sensing part 1140, an output part 1150, a memory 1160, and a processor 1170.

The communication part 1110 can transmit and/or receive data to and/or from external devices such as the AI devices and the AI server using wire and/or wireless communication technology. For example, the communication part 1110 can transmit and/or receive sensor information, a user input, a learning model, and a control signal with external devices. The communication technology used by the communication part 1110 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1120 can acquire various kinds of data. The input part 1120 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1120 can acquire input data to be used when acquiring an output using learning data and a learning model for model learning. The input part 1120 may obtain raw input data, in which case the processor 1170 or the learning processor 1130 may extract input features by preprocessing the input data.

The learning processor 1130 may learn a model composed of an ANN using learning data. The learned ANN can be referred to as a learning model. The learning model can be used to infer result values for new input data rather than learning data, and the inferred values can be used as a basis for determining which actions to perform. The learning processor 1130 may perform AI processing together with the learning processor of the AI server. The learning processor 1130 may include a memory integrated and/or implemented in the AI device 1100. Alternatively, the learning processor 1130 may be implemented using the memory 1160, an external memory directly coupled to the AI device 1100, and/or a memory maintained in an external device.

The sensing part 1140 may acquire at least one of internal information of the AI device 1100, environment information of the AI device 1100, and/or the user information using various sensors. The sensors included in the sensing part 1140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1150 may generate an output related to visual, auditory, tactile, etc. The output part 1150 may include a display unit for outputting visual information, a speaker for outputting auditory information, and/or a haptic module for outputting tactile information.

The memory 1160 may store data that supports various functions of the AI device 1100. For example, the memory 1160 may store input data acquired by the input part 1120, learning data, a learning model, a learning history, etc.

The processor 1170 may determine at least one executable operation of the AI device 1100 based on information determined and/or generated using a data analysis algorithm and/or a machine learning algorithm. The processor 1170 may then control the components of the AI device 1100 to perform the determined operation. The processor 1170 may request, retrieve, receive, and/or utilize data in the learning processor 1130 and/or the memory 1160, and may control the components of the AI device 1100 to execute the predicted operation and/or the operation determined to be desirable among the at least one executable operation. The processor 1170 may generate a control signal for controlling the external device, and may transmit the generated control signal to the external device, when the external device needs to be linked to perform the determined operation. The processor 1170 may obtain the intention information for the user input and determine the user's requirements based on the obtained intention information. The processor 1170 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1130 and/or learned by the learning processor of the AI server, and/or learned by their distributed processing. The processor 1170 may collect history information including the operation contents of the AI device 1100 and/or the user's feedback on the operation, etc. The processor 1170 may store the collected history information in the memory 1160 and/or the learning processor 1130, and/or transmit to an external device such as the AI server. The collected history information can be used to update the learning model. The processor 1170 may control at least some of the components of AI device 1100 to drive an application program stored in memory 1160. Furthermore, the processor 1170 may operate two or more of the components included in the AI device 1100 in combination with each other for driving the application program.

Figure 12:
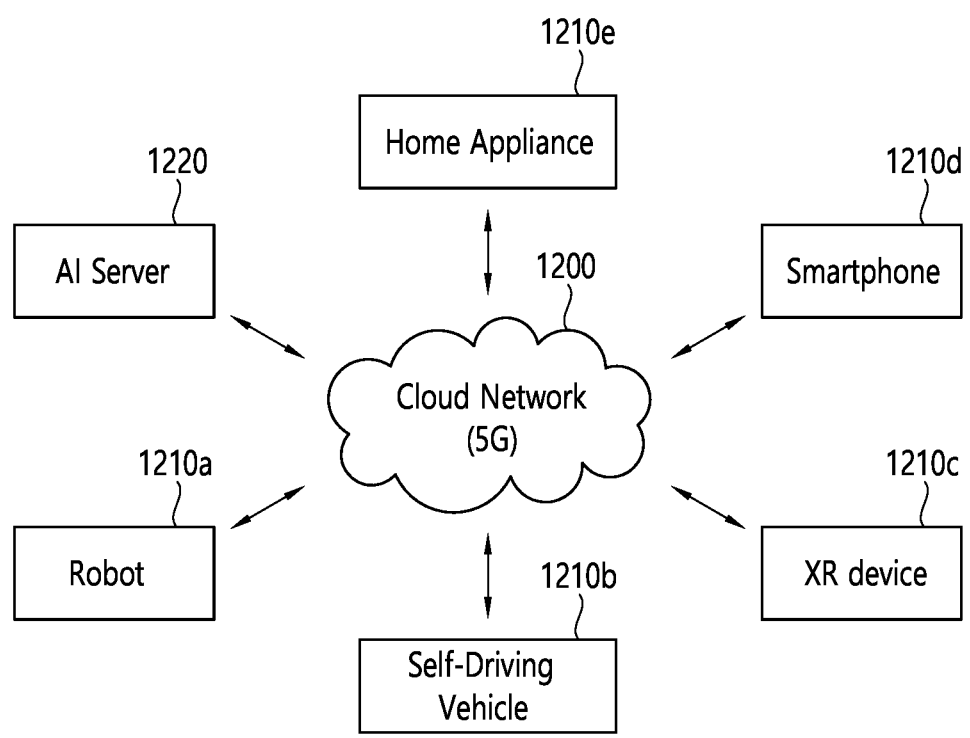
FIG. 12 shows an example of an AI system to which the technical features of the present invention can be applied.

FIG. 12 shows an example of an AI system to which the technical features of the present invention can be applied.

Referring to FIG. 12, in the AI system, at least one of an AI server 1220, a robot 1210*a*, an autonomous vehicle 1210*b*, an XR device 1210*c*, a smartphone 1210*d* and/or a home appliance 1210*e* is connected to a cloud network 1200. The robot 1210*a*, the autonomous vehicle 1210*b*, the XR device 1210*c*, the smartphone 1210*d*, and/or the home appliance 1210*e* to which the AI technology is applied may be referred to as AI devices 1210*a* to 1210*e*.

The cloud network 1200 may refer to a network that forms part of a cloud computing infrastructure and/or resides in a cloud computing infrastructure. The cloud network 1200 may be configured using a 3G network, a 4G or LTE network, and/or a 5G network. That is, each of the devices 1210*a* to 1210*e* and 1220 consisting the AI system may be connected to each other through the cloud network 1200. In particular, each of the devices 1210*a* to 1210*e* and 1220 may communicate with each other through a base station, but may directly communicate with each other without using a base station.

The AI server 1220 may include a server for performing AI processing and a server for performing operations on big data. The AI server 1220 is connected to at least one or more of AI devices constituting the AI system, i.e. the robot 1210*a*, the autonomous vehicle 1210*b*, the XR device 1210*c*, the smartphone 1210*d* and/or the home appliance 1210*e* through the cloud network 1200, and may assist at least some AI processing of the connected AI devices 1210*a* to 1210*e*. The AI server 1220 can learn the ANN according to the machine learning algorithm on behalf of the AI devices 1210*a* to 1210*e*, and can directly store the learning models and/or transmit them to the AI devices 1210*a* to 1210*e*. The AI server 1220 may receive the input data from the AI devices 1210*a* to 1210*e*, infer the result value with respect to the received input data using the learning model, generate a response and/or a control command based on the inferred result value, and transmit the generated data to the AI devices 1210*a* to 1210*e*. Alternatively, the AI devices 1210*a* to 1210*e* may directly infer result value for the input data using a learning model, and generate a response and/or a control command based on the inferred result value.

Various embodiments of the AI devices 1210*a* to 1210*e* to which the technical features of the present invention can be applied will be described. The AI devices 1210*a* to 1210*e* shown in FIG. 12 can be seen as specific embodiments of the AI device 1100 shown in FIG. 11.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device in a wireless communication system, the method comprising:
　　receiving a measurement configuration for a first measurement and a second measurement from a network,
　　wherein the measurement configuration includes (i) measurement objects including at least one unlicensed frequency, (ii) reporting configurations, and (iii) at least one measurement identity,
　　wherein the first measurement is at least one of a reference signal received power (RSRP) measurement or a reference signal received quality (RSRQ) measurement, and
　　wherein the second measurement is a channel occupancy measurement;
　　receiving, from the network, a first threshold value related to the first measurement and a second threshold value related to the second measurement;
　　determining the first measurement as a reference measurement; and
　　performing the reference measurement on the at least one unlicensed frequency; and
　　based on the result of the first measurement being lower than the first threshold value:
　　　　determining not to perform the second measurement on the at least one unlicensed frequency; and
　　　　skipping to perform the second measurement on the unlicensed frequency; or
　　based on the result of the first measurement being greater than or equal to the first threshold value:
　　　　determining to perform the second measurement on the at least one unlicensed frequency; and
　　　　performing the second measurement on the unlicensed frequency relative to the second threshold.

2. The method of claim 1, wherein the method further comprises:
　　receiving, from the network, a reference measurement configuration,
　　wherein the first measurement is determined as the reference measurement based on the reference measurement configuration.

3. The method of claim 1, wherein the wireless device is an autonomous driving apparatus in communication with at least one of a mobile terminal, a network, or an autonomous vehicle.

4. A wireless device in a wireless communication system, the wireless device comprising:
　　a memory;
　　a transceiver; and
　　a processor, operably coupled to the memory and the transceiver, and configured to:
　　　　control the transceiver to receive a measurement configuration for a first measurement and a second measurement from a network,
　　　　wherein the measurement configuration includes (i) measurement objects including at least one unlicensed frequency, (ii) reporting configurations, and (iii) at least one measurement identity,
　　　　wherein the first measurement is at least one of a reference signal received power (RSRP) measurement or a reference signal received quality (RSRQ) measurement, and
　　　　wherein the second measurement is a channel occupancy measurement;
　　　　receive, from the network, a first threshold value related to the first measurement and a second threshold value related to the second measurement;
　　　　determine the first measurement as a reference measurement; and
　　　　perform the reference measurement on the at least one unlicensed frequency; and
　　　　based on the result of the first measurement being lower than the first threshold value:
　　　　　　determine not to perform the second measurement on the at least one unlicensed frequency; and
　　　　　　skip to perform the second measurement on the unlicensed frequency; or
　　　　based on the result of the first measurement being greater than or equal to the first threshold value:
　　　　　　determine to perform the second measurement on the at least one unlicensed frequency; and
　　　　　　perform the second measurement on the unlicensed frequency relative to the second threshold.

5. At least one non-transitory computer-readable storage medium storing instructions that, based on being executed by a processor, the operations comprising:
　　receiving a measurement configuration for a first measurement and a second measurement from a network,
　　wherein the measurement configuration includes (i) measurement objects including at least one unlicensed frequency, (ii) reporting configurations, and (iii) at least one measurement identity,
　　wherein the first measurement is at least one of a reference signal received power (RSRP) measurement or a reference signal received quality (RSRQ) measurement, and
　　wherein the second measurement is a channel occupancy measurement;
　　receiving, from the network, a first threshold value related to the first measurement and a second threshold value related to the second measurement;
　　determining the first measurement as a reference measurement; and
　　performing the reference measurement on the at least one unlicensed frequency; and
　　based on the result of the first measurement being lower than the first threshold value:
　　　　determining not to perform the second measurement on the at least one unlicensed frequency; and
　　　　skipping to perform the second measurement on the unlicensed frequency; or
　　based on the result of the first measurement being greater than or equal to the first threshold value:
　　　　determining to perform the second measurement on the at least one unlicensed frequency; and performing the second measurement on the unlicensed frequency relative to the second threshold.

* * * * *